June 22, 1926.
F. W. ELLS
1,589,873
MOTOR SUPPORT FOR LINOTYPE MACHINES
Filed Dec. 4, 1922
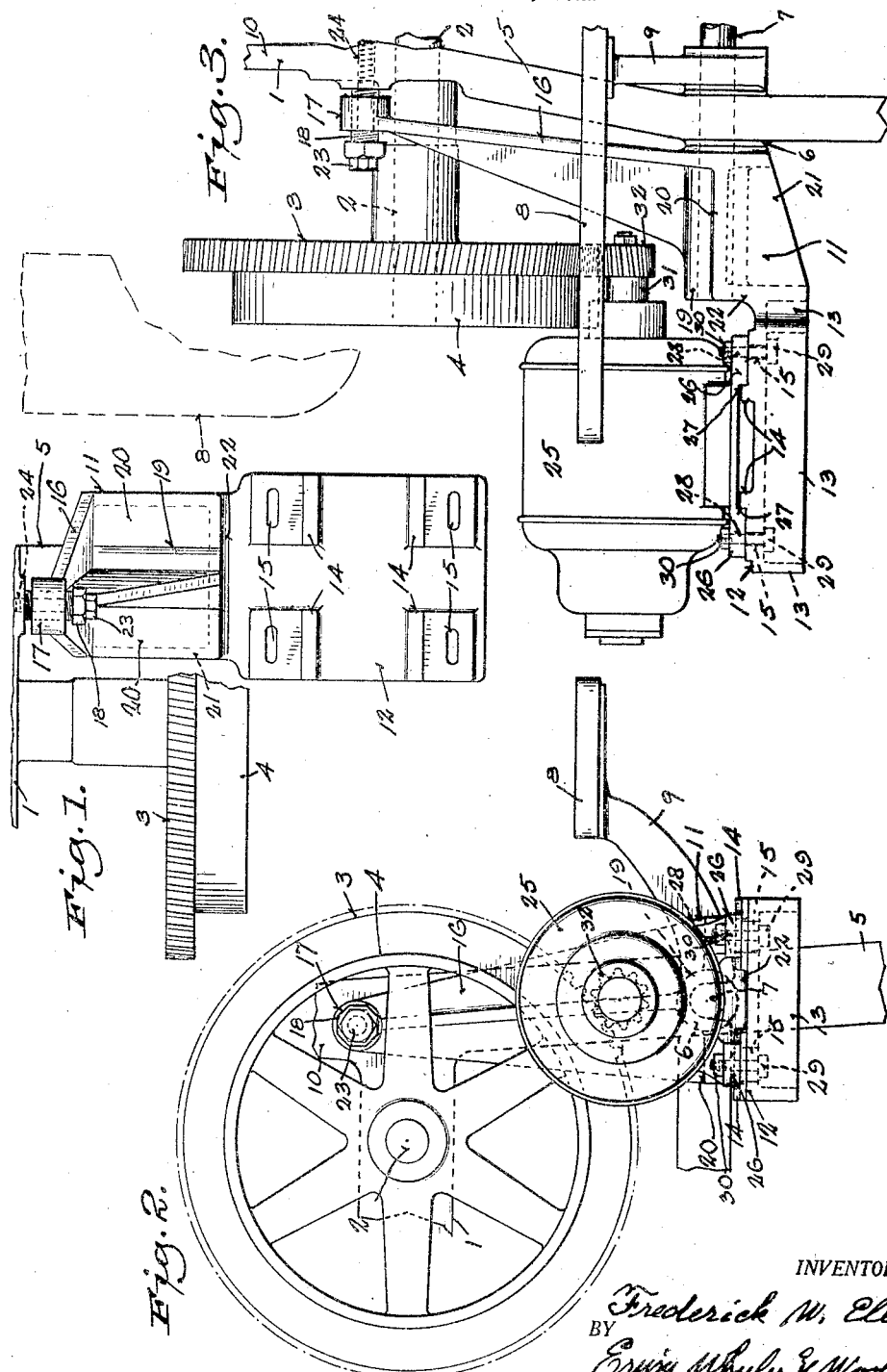
INVENTOR:
Frederick W. Ells
BY
Erwin Wheeler & Woolard
ATTORNEYS.

Patented June 22, 1926.

1,589,873

UNITED STATES PATENT OFFICE.

FREDERICK W. ELLS, OF MILWAUKEE, WISCONSIN.

MOTOR SUPPORT FOR LINOTYPE MACHINES.

Application filed December 4, 1922. Serial No. 604,648.

This invention relates to improvements in motor supports for linotype machines.

Supporting brackets for motors as have previously been designed for use in connection with linotype machines were so made as to tend to exert a shearing stress upon the bolts which anchored the bracket to the framework of the machine. The weight of the motor was so positioned in respect to the points of suspension of the brackets that it would tend to cause the motor to become unstable and require continual attention in order that the drive pinion might not work out of alignment with the gear. Another serious fault in the construction of these brackets was that in order to remove the pinion from the motor shaft, the motor had to be removed from the support, which made necessary the realignment of the pinion and gear when the motor was again placed in operative position.

Accordingly, it is the primary object of this invention to provide for the driving motor an improved supporting bracket which may be suspended from a horizontally projecting end of a shaft ordinarily provided in linotype machines and which will, when so suspended, support the motor in such a manner as to hold the drive pinion on the motor shaft substantially vertically above the point of suspension, and with a minimum of shearing stress upon the supporting shaft.

It is a further object of this invention to provide an anchoring arm for the supporting bracket which will extend upwardly above the point of suspension and which may be anchored near its end by a bolt which will be substantially aligned vertically with both the supporting shaft and the pinion, thereby providing a bracket which will be inherently stable and will resist to a marked degree and without exerting shearing stresses on the supporting means any force tending to disalign the pinion and its driven gears.

It is also an object of this invention to provide means associated with the anchoring arm of a motor supporting base which will permit ready adjustment of the anchoring arm and base to meet varying conditions of alignment in different linotype machines and obviate the necessity of using shims.

It is a further object of this invention to provide a supporting bracket for motors which will support the motor in a position that will be more readily accessible for repair and wherein the driving pinion may be removed from the motor shaft without necessitating the displacement of the motor.

It is also a further object of this invention to provide co-operating means upon the motor base and supporting bracket whereby the driving pinion and gear may be easily aligned and retained in such position.

It is a further object of this invention to provide a supporting bracket for motors which may be easily and cheaply manufactured and which may be readily attached to a linotype machine, utilizing existing agencies as far as possible in attaining the objects heretofore specified.

In the drawings:

Fig. 1 is a plan view of the supporting bracket and a fragmentary portion of the framework of a linotype to which the bracket is attached.

Fig. 2 is an end elevation of the driven gear and pulley and a portion of the framework of a linotype machine, showing the supporting bracket and motor thereon attached to the framework.

Fig. 3 is a side elevation showing a fragmentary portion of the framework, the driven gear, and pulley, and a supporting bracket attached to the framework and having a motor seated thereon in operative position.

Like parts are identified by the same reference characters throughout the several views.

The framework of a linotype machine is designated generally by the numeral 1. A rotatable shaft 2 extends through the framework 1, and rotatably mounted upon shaft 2 is a gear 3 having a pulley 4 integral therewith. The linotype machine is provided in the first instance with a pulley only, and for the purposes of this invention the combined gear and pulley is preferably substituted.

The framework 1 has a downwardly extending leg 5 provided with a boss 6 through which a shaft 7 extends. A step 8 has an arm 9 extending therefrom which rests upon shaft 7 and is anchored at a point, not shown, to provide against rotation of the step 8 about the shaft 7. The framework 1 also has an arm 10 extending upwardly.

The supporting bracket is shown at 11. It has a substantially horizontal base 12 having a downwardly extending, peripherally disposed flange 13 adapted to reenforce the base. The base 12 is provided with upwardly protruding transverse shoulders 14 and transversely slotted holes 15. The shoulders 14 are adapted to hold the motor properly aligned and the slots 15 are adapted to allow bolts which anchor the motor to the bracket 11, to move transversely of the base 12 in adjusting the motor to and from the gear 3 to secure a proper setting of the driving pinion with reference to said gear.

Extending upwardly from the base 12 is a webbed arm 16 which terminates at its upper end in an anchoring sleeve 17. The arm 16 has at its lower end and above the base 12 a supporting sleeve 19, the bore of which is, in the present embodiment of this invention, preferably disposed with its axis in a plane parallel to, and only slightly above, that of the base 12. The supporting sleeve 19 is reenforced by webs 20 and 21 and is connected to the base 12 at 22.

The supporting bracket 11 is attached to the framework 1 by sliding the supporting sleeve 19 upon the projecting end of the shaft 7. A bolt 23 is then passed through a loosely fitted bushing 18 threaded into and through the sleeve 17, said bolt 23 then being screwed into a hole 24 provided in the arm 10 of the framework 1. To obtain the proper alignment of the base 12, the threaded bushing 18 may be rotated inwardly or outwardly of sleeve 17, as desired. Bushing 18 may then be effectively secured against rotation by tightening bolt 23, which also clamps the bushing against the machine frame and fixes the whole bracket in the desired adjustment.

Upon the base 12 is mounted a motor 25 having feet 26. The feet 26 are cut away at 27 to provide shoulders adapted to register with and to engage the outer margins of the shoulders 14. Holes 28 are adapted to register with the slots 15 in the base 12. Bolts 29 pass upwardly through the slots 15 in the base 12 and holes 28 in the feet 26 and are threadably engaged by nuts 30. When it is desired to align the pinion 32 with the gear 31, the motor 25 is moved transversely across the base 12. When the desired alignment has been obtained, the nuts 30 are tightened upon bolts 29 to retain the motor and pinion in operative position.

It will be noted that the pinion 32 is held in a position substantially vertically above the supporting sleeve 19 and shaft 7. It will also be noted that the pinion 32 is readily accessible and easily removed from the shaft 31 without disturbing the motor 25 or the bracket 11.

Furthermore, the length of arm 16 and the disposition of the securing bolt 23 with reference to the pinion and to sleeve 19 is such that anchoring means have been provided which depend upon the tensile strength of the anchoring bolt rather than its ability to resist shearing.

It will further be seen that means have been provided for securing the motor in a given position with its pinion aligned with the driven gear and that a very fine adjustment is made possible in another direction for setting the pinion in a desired mesh. Also the nature of the bracket and its position is such that reactionary forces developed by the pinion in driving the gear will be practically aligned in direction with a line connecting the points of support of the bracket. Thus there is little if any tendency for the bracket to become displaced, and such tendency as may exist is amply counteracted by the bracket construction.

It will also be seen that in accomplishing the principal objects of this invention, a bracket has been provided which may be cheaply manufactured and easily installed upon a linotype machine without alteration of the framework thereof.

I claim:

1. A typesetting machine motor support comprising a transversely shouldered base, an arm extending upwardly at the rear of the base and provided with vertically spaced means adapted to interact with supporting elements, and adapted for adjustment to align the base relative to said machine, and means for adjustably securing to said base a driving motor shouldered for interlocking engagement with the shoulders upon said base, said base and arm being adapted to support a motor with its shaft between said vertically spaced interacting means.

2. The combination with a typesetting machine provided with a gear upon its driving shaft and with a frame having a secondary shaft projecting therefrom, of a bracket apertured to receive said secondary shaft and provided with a motor receiving platform, an arm extending above said aperture, means for securing said arm to the frame of the machine at a point remote from said aperture and a motor mounted upon said platform and provided with a pinion adapted to be meshed with said gear, said pinion being disposed substantially vertically above said aperture.

3. The combination with a typesetting machine provided with a gear upon its driving shaft and with a frame having a secondary shaft projecting therefrom, of a bracket apertured to receive said secondary shaft and provided with a motor receiving platform, an arm extending above said aperture, means for securing said arm to the frame of the machine at a point remote from said aperture, and a motor mounted upon said platform and provided with a pinion adapted to be meshed with said gear, said pinion being normally disposed substantially in a plane intersecting said secondary shaft and the point of attachment between said arm and said frame.

4. The combination with a typesetting machine provided with a gear upon its driving shaft and having a frame with a secondary shaft projecting therefrom, of a bracket provided with a transversely shouldered platform and an arm extending upwardly from the rear thereof and apertured adjacent said platform to receive said secondary shaft, means for adjustably securing said arm to a portion of said frame substantially vertically removed above said shaft receiving aperture, a motor shouldered for interaction with the shoulders upon said platform and transversely adjustable with reference to the platform, and a pinion associated with the motor and arranged to mesh with said gear in a suitable adjustment of said motor.

5. A motor support for typesetting machines comprising a horizontal base, a supporting sleeve at one side of and above said base, an arm extending upwardly from said sleeve, and an anchoring sleeve at the end of said arm, said support being adapted to support a motor with the projecting end of its shaft positioned substantially vertically above said sleeve.

6. A motor support for typesetting machines, comprising a base, a supporting sleeve at one side of and above said base, and an anchoring arm extending vertically from said sleeve.

7. The combination with a motor having a shaft and a pinion mounted upon the end of such shaft, of a base, an arm integral with said base, a supporting sleeve incorporated in said arm, and an anchoring sleeve at the extremity of said arm, whereby the shaft and pinion are held substantially vertically above the supporting sleeve.

8. The combination with a motor having a shaft, and a pinion upon the end of such shaft, of a base, an arm integral with said base, a supporting sleeve incorporated in said arm, an anchoring sleeve at the extremity of said arm, a bushing adjustably threaded through said anchoring sleeve, and a bolt passing through said bushing, whereby the shaft and pinion are held substantially horizontal.

9. A motor support adapted for attachment to a machine frame, said support including a motor receiving base, an upright arm, an adjusting sleeve in threaded engagement with said arm, and a bolt receivable within said sleeve and adapted for threaded engagement with the frame, whereby said arm may be adjustably positioned with reference to machine frame.

10. A motor support adapted for attachment to a machine frame, said support including a motor receiving base arranged to project outwardly from said frame in a horizontal position, an arm extending upwardly therefrom and adapted to receive a supporting element in close proximity to said base, an adjusting sleeve in threaded engagement with said arm at a point remote from the portion of said arm adapted to receive said supporting element, and a bolt receivable in said sleeve for securing it to a portion of said frame.

11. In combination with a motor having feet slotted in their bottoms, of a base having upwardly projecting transverse elements adapted to engage the inner margins of the slots, and an upwardly extending arm integral with said base having a supporting sleeve at its lower end and an anchoring sleeve at its upper end.

12. The combination with a typesetting machine provided with a gear upon its driving shaft and having a frame with a secondary shaft projecting therefrom, of a bracket provided with a transversely shouldered platform and an arm extending upwardly from the rear thereof and having an aperture adjacent said platform to receive a portion of said secondary shaft and adjustable attaching means substantially vertically removed above said shaft receiving aperture, a motor shouldered for interaction with the shoulders upon said platform and transversely adjustable with reference to the platform, and a pinion associated with the motor and arranged to mesh with said gear in a suitable adjustment of said motor, said pinion being normally disposed above said shaft receiving aperture and materially beneath the point of attachment between said arm and said frame.

FREDERICK W. ELLS.